US008867926B2

(12) United States Patent
Xie et al.

(10) Patent No.: US 8,867,926 B2
(45) Date of Patent: Oct. 21, 2014

(54) OPTICAL COMMUNICATION OF INTERLEAVED SYMBOLS ASSOCIATED WITH POLARIZATIONS

(71) Applicants: Chongjin Xie, Morganville, NJ (US); Luis Salamanca, Sevilla (ES)

(72) Inventors: Chongjin Xie, Morganville, NJ (US); Luis Salamanca, Sevilla (ES)

(73) Assignee: Alcatel Lucent, Boulogne-Billancourt (FR)

( * ) Notice: Subject to any disclaimer, the term of this patent is extended or adjusted under 35 U.S.C. 154(b) by 48 days.

(21) Appl. No.: 13/632,094

(22) Filed: Sep. 30, 2012

(65) Prior Publication Data
US 2014/0079394 A1    Mar. 20, 2014

Related U.S. Application Data

(60) Provisional application No. 61/701,634, filed on Sep. 15, 2012.

(51) Int. Cl.
*H04B 10/04* (2006.01)

(52) U.S. Cl.
USPC ............ 398/184; 398/65; 398/183; 398/188; 398/202; 398/205; 398/152

(58) Field of Classification Search
USPC ......... 398/183, 184, 188, 202, 204, 205, 206, 398/207, 208, 209, 158, 159, 65, 152, 192, 398/193, 194
See application file for complete search history.

(56) References Cited

U.S. PATENT DOCUMENTS

| 7,894,724 B2 * | 2/2011 | Bontu et al. | 398/152 |
|---|---|---|---|
| 8,175,466 B2 * | 5/2012 | Djordjevic et al. | 398/202 |
| 2011/0150498 A1 * | 6/2011 | Meiman et al. | 398/152 |
| 2011/0255858 A1 * | 10/2011 | Xie et al. | 398/1 |
| 2012/0257896 A1 * | 10/2012 | Djordjevic et al. | 398/65 |
| 2013/0216221 A1 * | 8/2013 | Zhang et al. | 398/43 |

FOREIGN PATENT DOCUMENTS

EP         1708391           4/2006
WO   PCT/US2013/057789   11/2013

OTHER PUBLICATIONS

Allan D et al: "Intelligent load balancing for shortest path bridging", IEEE Communications Magazone, IEEE Service Enter, Piscataway, US, vol. 50, No. 7, Jul. 1, 2012, pp. 163-167, XP011478272, ISSN: 0163-6804, DOI: 10.1109/MCOM.2012.6231293 the whole document.

* cited by examiner

*Primary Examiner* — Hanh Phan
(74) *Attorney, Agent, or Firm* — A. Ralston

(57) ABSTRACT

An apparatus comprises a coherent optical transmitter. The coherent optical transmitter comprises a first modulator for generating a first polarization, a second modulator for generating a second polarization, and a symbol interleaver configured to receive a first symbol stream intended to be transmitted on a first polarization and a second symbol stream intended to be transmitted on a second polarization, to direct one portion of symbols of the first symbol stream to the first modulator for modulation onto the first polarization and another portion of the symbols of the first symbol stream to the second modulator for modulation onto the second polarization, and to direct one portion of symbols of the second symbol stream to the first modulator for modulation onto the first polarization and another portion of the symbols of the second symbol stream to the second modulator for modulation onto the second polarization.

25 Claims, 3 Drawing Sheets

OPTICAL COMMUNICATION OF INTERLEAVED SYMBOLS ASSOCIATED WITH POLARIZATIONS

CROSS REFERENCE TO RELATED APPLICATION

This application claims the benefit of U.S. Provisional Patent Application Ser. No. 61/701,634, filed Sep. 15, 2012, which is hereby incorporated herein by reference in its entirety.

FIELD OF THE INVENTION

The invention(s) relate to optical communication equipment and, more specifically but not exclusively, to equipment for managing data transport through an optical channel.

SUMMARY

In one embodiment, an apparatus comprises a coherent optical transmitter. The coherent optical transmitter comprises a first modulator for generating a first polarization, a second modulator for generating a second polarization, and a symbol interleaver configured to receive a first symbol stream intended to be transmitted on a first polarization and a second symbol stream intended to be transmitted on a second polarization, to direct one portion of symbols of the first symbol stream to the first modulator for modulation onto the first polarization and another portion of the symbols of the first symbol stream to the second modulator for modulation onto the second polarization, and to direct one portion of symbols of the second symbol stream to the first modulator for modulation onto the first polarization and another portion of the symbols of the second symbol stream to the second modulator for modulation onto the second polarization.

In one embodiment, the symbol interleaver is configured to direct the symbols of the first symbol stream in an alternating manner to the first modulator for modulation onto the first polarization and to the second modulator for modulation onto the second polarization, and to direct the symbols of the second symbol stream in a corresponding alternating manner to the first modulator for modulation onto the first polarization and to the second modulator for modulation onto the second polarization.

In one embodiment, the symbol interleaver is configured to direct every first of a respective pair of symbols of the first symbol stream to the first modulator for modulation onto the first polarization and every second of the respective pair of symbols of the first symbol stream to the second modulator for modulation onto the second polarization, and to direct every first of a respective pair of symbols of the second symbol stream to the first modulator for modulation onto the first polarization and every second of the respective pair of symbols of the second symbol stream to the second modulator for modulation onto the second polarization In one embodiment, the coherent optical transmitter further comprises a first forward error correction encoder for apply redundancy to a first bit stream to generate a first encoded bit stream, and a first symbol mapper for generating the first symbol stream from the first encoded bit stream.

In one embodiment, the coherent optical transmitter further comprises a polarization beam combiner for combined the first polarization and the second polarization for generating a polarization division multiplexed optical signal.

In one embodiment, the first symbol stream and the second symbol stream are independent, not inter-related, not derived from a single bit stream or a combination thereof.

In one embodiment, an apparatus comprises a coherent optical transmitter. The coherent optical transmitter comprises a first modulator for generating a first polarization, a second modulator for generating a second polarization, and an interleaver configured to receive data associated with a first symbol stream intended to be transmitted on a first polarization and data associated with a second symbol stream intended to be transmitted on a second polarization, to direct one portion of the data associated with the first symbol stream to the first modulator for modulation onto the first polarization and another portion of the data associated with the first symbol stream to the second modulator for modulation onto the second polarization, and to direct one portion of the data associated with the second symbol stream to the first modulator for modulation onto the first polarization and another portion of the data associated with the second symbol stream to the second modulator for modulation onto the second polarization.

In one embodiment, the interleaver is configured to direct portions of the data associated with the first symbol stream in an alternating manner to the first modulator for modulation onto the first polarization and to the second modulator for modulation onto the second polarization; and to direct portions of the data associated with of the second symbol stream in a corresponding alternating manner to the first modulator for modulation onto the first polarization and to the second modulator for modulation onto the second polarization.

In one embodiment, the portions of the data associated with the first symbol stream and the portions of the data associated with the second symbol stream are a number of input bits that define a symbol.

In one embodiment, the portions of the data associated with the first symbol stream and the portions of the data associated with the second symbol stream are symbols.

In one embodiment, the interleaver is configured to direct every first portion of the data associated with the first symbol stream to the first modulator for modulation onto the first polarization and every second portion of the data associated with the first symbol stream to the second modulator for modulation onto the second polarization and to direct every first portion of the data associated with the second symbol stream to the first modulator for modulation onto the first polarization and every second portion of the data associated with the second symbol stream to the second modulator for modulation onto the second polarization In one embodiment, the coherent optical transmitter further comprises a first forward error correction encoder for applying redundancy to the data associated with the first symbol stream and the data associated with the second symbol stream that are directed to the first modulator, and a first symbol mapper for generating a first symbol stream from the data associated with the first symbol stream and the data associated with the second symbol stream that are directed to the first modulator after redundancy application, wherein the first modulator is configured to modulate the first symbol steam to generate the first polarization.

In one embodiment, the coherent optical transmitter further comprises a first forward error correction encoder for apply redundancy to the one portion of the data associated with the first symbol stream and the one portion of the data associated with the second symbol stream that are directed to the first modulator, and a first symbol mapper for generating a first symbol stream from the one portion of the data associated with the first symbol stream and the one portion of the data associated with the second symbol stream that are directed to the first modulator after the application of redundancy, wherein the first modulator is configured to modulate the first symbol steam to generate the first polarization.

In one embodiment, the coherent optical transmitter further comprises a polarization beam combiner for combined the first polarization and the second polarization for generating a polarization division multiplexed optical signal.

In one embodiment, the first symbol stream and the second symbol stream are independent, not inter-related, not derived from a single bit stream or a combination thereof.

In one embodiment is also included a coherent optical receiver for decoding a received optical signal with interleaved polarizations, the coherent optical receiver configured to deinterleave polarizations of the received optical signal prior to symbol demapping.

In one embodiment, is also included coherent optical receiver for decoding a received optical signal with interleaved polarizations, the coherent optical receiver configured to deinterleave the interleaved polarizations in a manner corresponding to the coherent optical transmitter.

In one embodiment, a method comprises receiving at a transmitter data associated with a first symbol stream intended to be transmitted on a first polarization and a data associated with second symbol stream intended to be transmitted on a second polarization, directing one portion of the data associated with the first symbol stream for modulation onto the first polarization and another portion of the data associated with the first symbol stream for modulation onto the second polarization, and directing one portion of the data associated with the second symbol stream for modulation onto the first polarization and another portion of the data associated with the second symbol stream for modulation onto the second polarization.

In one embodiment, the data associated with the first symbol stream and the data associated with second symbol stream is symbol data.

In one embodiment, the method includes modulating the one portions to generate the first polarization, and modulating the another portions to generate the second polarization.

In one embodiment, the directing of the one portion and the another portion of the data associated with the first symbol stream is performed in an alternating manner, and wherein the directing of the one portion and the another portion of the data associated with the second symbol stream is performed in a manner corresponding to the alternating manner.

In one embodiment, the directing of the one portion and the another portion of the data associated with the first symbol stream directs every first of a respective pair of symbols of the data associated with the first symbol stream to the first modulator for modulation onto the first polarization and every second of the respective pair of symbols of the data associated with the first symbol stream to the second modulator for modulation onto the second polarization; and wherein the directing of the one portion and the another portion of the data associated with the second symbol stream directs every first of a respective pair of symbols of the data associated with the second symbol stream to the first modulator for modulation onto the first polarization and every second of the respective pair of symbols of the data associated with the second symbol stream to the second modulator for modulation onto the second polarization In one embodiment, the method includes applying redundancy to the data associated with the first symbol stream, and generating symbols for the data associated with the first symbol stream.

In one embodiment, the applying redundancy and generating symbols is performed before or after the directing of the one portion and the another portion of the data associated with the first symbol stream and the directing of the one portion and the another portion of the data associated with the second symbol stream.

In one embodiment, the method includes combining the first polarization and the second polarization for generating a polarization division multiplexed optical signal.

In one embodiment, the first symbol stream and the second symbol stream are independent, not inter-related, not derived from a single bit stream or a combination thereof.

In one embodiment, an apparatus comprises an optical receiver. The optical receiver comprises a front-end circuit configured to convert a received optical signal versions of a polarization multiplexed signal into a corresponding plurality of digital electrical signals, and a processor configured to deinterleave symbols of the received polarizations to generate deinterleaved polarization data, and to process the deinterleaved polarization data to decode a payload data.

In one embodiment, the processor of the optical receiver is configured to symbol demap the deinterleaved polarization data, and to forward error correction decode the deinterleaved polarization data that has been demapped.

In one embodiment, the processor of the optical receiver is configured to perform a symbol probability density function (PDF) calculation on the deinterleaved polarization data, and to provide an output of the PDF calculation to assist in forward error correction decoding.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

This section describes aspects that may help facilitate a better understanding of the invention(s). Accordingly, the statements of this section are to be read in this light and are not to be understood as admissions about what is in the prior art or what is not in the prior art.

Forward error correction (FEC) uses redundant data to reduce the bit-error rate (BER) at the receiver. The cost of this reduction is a concomitant increase in the required forward-channel bandwidth, the latter being dependent on the overhead of the FEC code. In general, an FEC code with a larger overhead or lower net data rate is used for a noisier channel. When the channel conditions change over time, the net data rate and/or the FEC code can be adaptively changed to maintain an acceptable BER.

Soft-decision forward-error correction (SD-FEC) has become an important means to improve the reach and performance of optical communication systems with bit rates of 100-Gb/s and beyond. Unlike hard-decision FEC, soft-FEC does not operate on decided symbols but on reliabilities of the received symbols. SD-FEC schemes are typically designed for additive white Gaussian noise (AWGN) channels. In some optical communication systems, fiber nonlinearities make the statistical distributions of received symbols non-Gaussian. In this case, SD-FEC decoding based on the AWGN assumption will see its performance degraded.

In addition, inter-channel nonlinearities such as those in systems with mixed 10-G on-off-keyed (OOK) channels and coherent channels and polarization-dependent loss (PDL) can make a big difference in the performance at the two polarizations for polarization-division-multiplexed (PDM) signals. In this case, although the average BER over the two polarizations is below the FEC threshold, the post-FEC BER cannot be error free as the BER at one polarization may be higher than the FEC threshold.

Figure 1A:
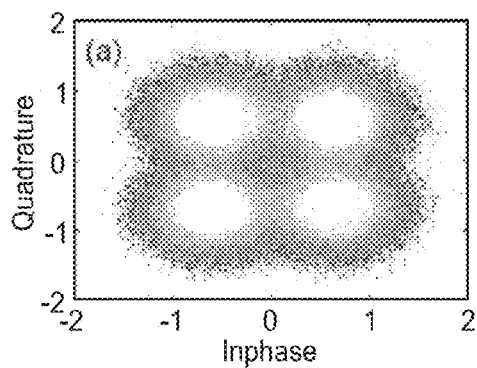
FIGS. 1(a), 1(b), 1(c) and 1(d) show some examples of signal constellations of Polarization Division Multiplexed Quadrature Phase Shift Keying (PDM-QPSK) signals at a receiver for two different system configurations.
Figure 1B:
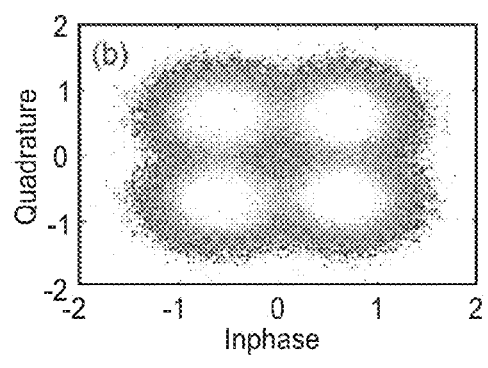
Figure 1C:
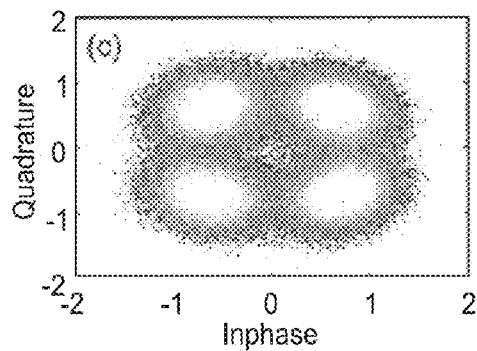
Figure 1D:
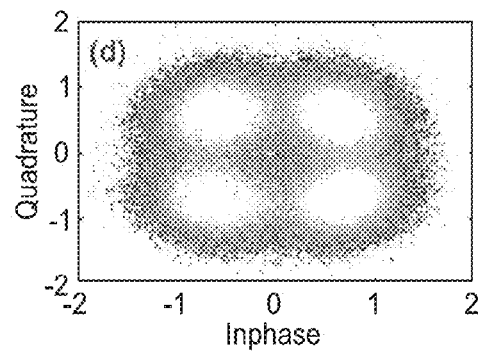

FIGS. 1(a), 1(b), 1(c) and 1(d) show some examples of signal constellations of polarization-division-multiplexed quadrature-phase-shift-keying (PDM-QPSK) signals at the receiver for two different system configurations. The figures illustrate the received 130-Gb/s PDM-QPSK signal constellations in the two different systems. One system is in back-to-back operation with loaded Amplified Spontaneous Emission (ASE) noise (FIGS. 1(a) and 1(b)), and the second system is a mixed transmission system with fifteen 10 Gb/s on-off-keying (OOK) channels and one 130 Gb/s PDM-QPSK channel (FIGS. 1(c) and 1(d)). These two systems have the similar pre-FEC BER. FIG. 1(a) illustrates the x polarization in the back-to-back system with 130 Gb/s PDM-QPSK channels. FIG. 1(b) illustrates the y polarization in the back-to-back system with Gb/s PDM-QPSK channels. FIG. 1(c) illustrates the x polarization in a mixed 10-Gb/s OOK and 130-Gb/s PDM-QPSK system. FIG. 1(d) illustrates the y polarization in a mixed 10-Gb/s OOK and 130-Gb/s PDM-QPSK system.

FIGS. 1(a) and 1(b) are like an AWGN channel and the constellations clouds have a circular shape and the variances of the noise for both polarizations are similar. FIGS. 1(c) and 1(d) show that in the mixed OOK and PDM-QPSK system, the constellation clouds are not circular and the y polarization is much worse (i.e., suffers from greater nonlinearities) than the x polarization. Due to polarization dependent nonlinearities and polarization dependent loss (PDL), there is a big difference in the BER in x and y polarizations.

The straightforward way to obtain the reliabilities of the received symbols is to assume that the received symbols have a bivariate Gaussian distribution and decode the received signal according to this distribution, considering both components as statistically independent. However, in a real-world optical communication system, the probability distribution of the received symbols can introduce correlations between the in-phase (I) and quadrature (Q) components, or could be very different from the conditionally bivariate Gaussian distribution. Thus, the assumption of an independent bivariate Gaussian distribution model will reduce the performance of soft-FEC.

Therefore, additional and/or alternative performance-enhancement techniques may be needed to overcome these and other pertinent limitations of transmission systems.

Accordingly, in embodiments provided herein, symbols of discrete symbol streams intended for communication on an x or y polarization are interleaved in the x and y polarizations transmitted to address the performance difference, in terms of noise, between the two polarizations. In other embodiments, a receiver receives an optical signal transmitted in the manner above, and de-interleaves the information carried by the polarizations prior to de-mapping the symbols for decoding of the information for its intended output stream. In another embodiment, a receiver records symbol histograms from the received data (i.e. data transmitted as above), in order to better estimate the value of the log likelihood ratio (LLR)s by means of considering the real probability density function of the received signal. This better estimate of the LLRs will serve to improve noticeable the performance of the soft-FEC.

Figure 2:
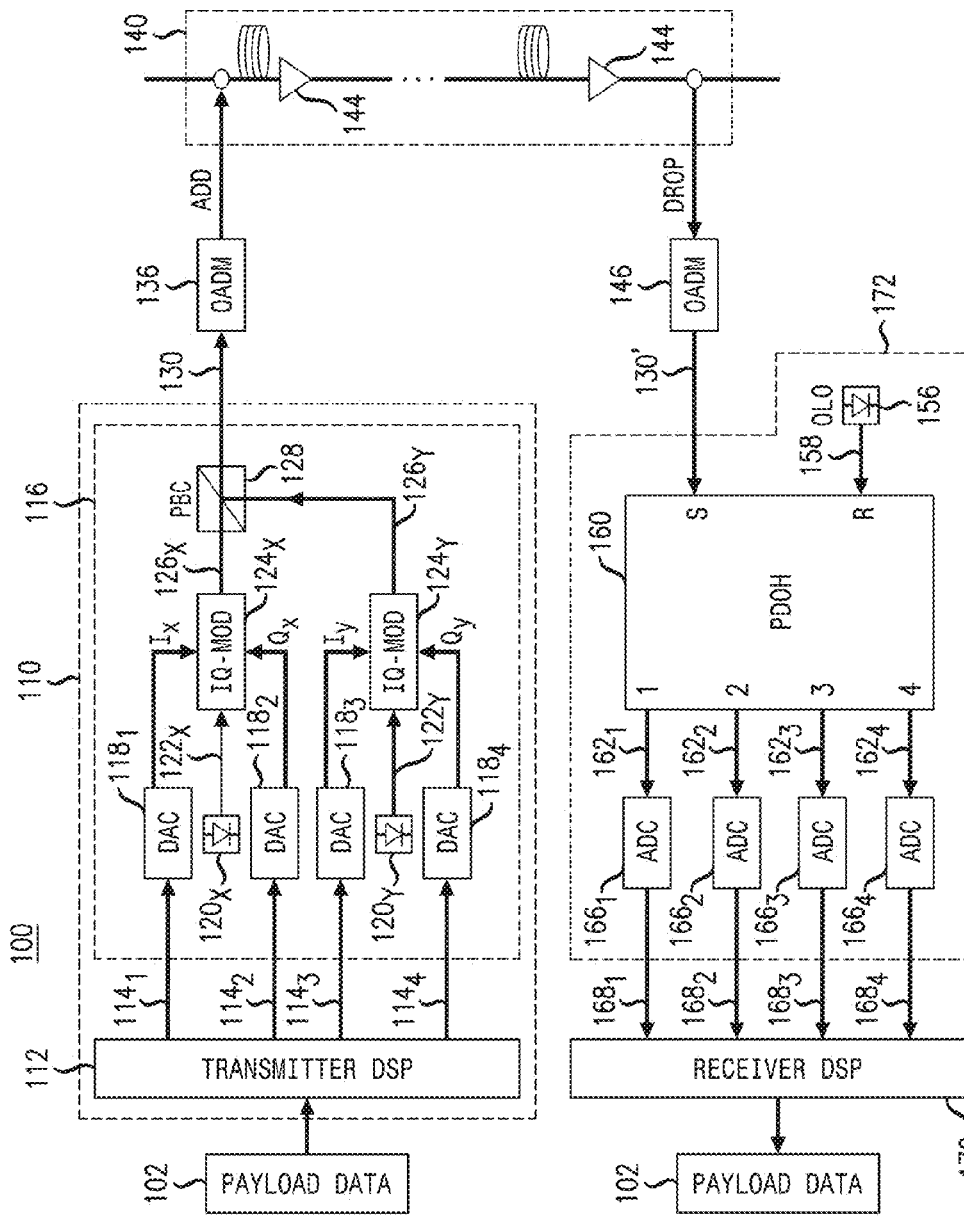
FIG. 2 shows a block diagram of an optical transmission system according to one embodiment of the invention.

FIG. 2 shows a block diagram of an optical transmission system 100 according to one embodiment of the invention. System 100 has an optical transmitter 110 that is configured to transmit polarization-division-multiplexed optical signals in which symbols originally intended to be transmitted by one of a respective first or second polarization of the PDM signal are interleaved prior to modulation and thus, a symbols originally intended to be carried by one of the first or second polarization are modulated to the first or second polarization in an alternating manner. That is; one portion of the symbols of a first symbol stream are provided to a first modulator for modulation onto a first polarization and another portion of the symbols of the first symbol stream are provided to a second modulator for modulation onto a second polarization. Likewise, one portion of the symbols of a second symbol stream are provided to the first modulator for modulation onto the first polarization and another portion of the symbols of the second symbol stream are provided to the second modulator for modulation onto the second polarization. Symbols of a data stream can be alternately directed for modulation onto the orthogonal polarizations of the PDM signal according to any chosen ratio.

For example, a first symbol of a first symbol stream may be modulated to a first polarization, a second symbol of the first symbol stream may be modulated to a second polarization, a third symbol of the first symbol stream may be modulated to the first polarization, a fourth symbol of the first symbol stream may be modulated to the second polarization, etc. In a corresponding manner, a first symbol of a second symbol stream may be modulated to the second polarization, a second symbol of the second symbol stream may be modulated to the first polarization, a third symbol of the second symbol stream may be modulated to the second polarization, a fourth symbol of the second symbol stream may be modulated to the first polarization, etc. That is; each time a symbol of one of the symbol streams is modulated to a polarization, the next symbol of that symbol stream is modulated to the other polarization.

For example, a first number of symbols of a first symbol stream may be modulated to a first polarization, a second number of symbols of the first symbol stream may be modulated to a second polarization, a third number of symbols of the first symbol stream may be modulated to the first polarization, a fourth number of symbols of the first symbol stream may be modulated to the second polarization, etc. In a corresponding manner, the first number of symbols of a second symbol stream may be modulated to the second polarization, the second number of symbols of the second symbol stream may be modulated to the first polarization, the third number of symbols of the second symbol stream may be modulated to the second polarization, the fourth number of symbols of the second symbol stream may be modulated to the first polarization, etc. That is; after a certain size set of symbols of one of the symbol streams is modulated to a polarization, a next set of symbols of that symbol stream is modulated to the other polarization and vise-versa for the other symbol stream for PDM optical signal.

System 100 also has an optical receiver 190 that is configured to process the received PDM signal to recover the corresponding original data in a manner that may serve to reduce the BER of data for a polarization below an error threshold, thus permitting the recover of symbols originally intended to be transmitted on both of the first or second polarization of the PDM signal. Transmitter 110 and receiver 190 are connected to one another via an optical transmission link 140.

Transmitter 110 receives an input stream 102 of payload data and applies it to a digital signal processor (DSP) 112. Processor 112 processes input stream 102 to generate digital signals $114_1$-$114_4$. Processor 112 interleaves symbols associated with input streams for modulation onto polarizations of the modulated optical output signal 130. In each signaling interval (time slot), signals $114_1$ and $114_2$ carry digital values that represent the in-phase (I) component and quadrature (Q) component, respectively, of a corresponding constellation symbol for transmission using X-polarized light. Signals $114_3$ and $114_4$ similarly carry digital values that represent the I and Q components, respectively, of the corresponding constellation symbol for transmission using Y-polarized light. Thus, digital signals $114_1$-$114_4$ represent interleaved constellation symbols for modulation.

An electrical-to-optical (E/O) converter (also sometimes referred to as a front end) 116 of transmitter 110 transforms digital signals $114_1$-$114_4$ into a modulated optical output signal 130. More specifically, digital-to-analog converters (DACs) $118_1$ and $118_2$ transform digital signals $114_1$ and $114_2$ into an analog form to generate drive signals $I_X$ and $Q_X$, respectively. Drive signals $I_X$ and $Q_X$ are then used, in a conventional manner, to drive an I-Q modulator $124x$. Based on drive signals $I_X$ and $Q_X$, I-Q modulator $124_X$ modulates an X-polarized beam $122_X$ of light supplied by a laser source $120_X$, thereby generating a modulated optical signal $126_X$.

DACs $118_3$ and $118_4$ similarly transform digital signals $114_3$ and $114_4$ into an analog form to generate drive signals $I_Y$ and $Q_Y$, respectively. Based on drive signals $I_Y$ and $Q_Y$, an I-Q modulator 124Y modulates a Y-polarized beam $122_Y$ of light supplied by a laser source $120_Y$, thereby generating a modulated optical signal $126_Y$. A polarization beam combiner 128 combines modulated optical signals $126_X$ and $126_Y$ to generate optical output signal 130. The transmitter 110 of the illustrated system 100 is shown as having the ability to transmit a polarization multiplexed optical signal.

The processor 112 may also add pilot symbols and/or pilot-symbol sequences to each of signals $114_1$, $114_2$, $114_3$, and $114_3$. One purpose of the added pilot symbols and/or pilot-symbol sequences is to form an optical frame having a well-defined structure. This structure can be used at receiver 190 to distinguish the optical symbols corresponding to the payload data from the pilot symbols/sequences, and to ensure the phase alignment. The pilot symbols/sequences can then be used to perform one or more of (i) time synchronization, (ii) channel estimation and compensation, (iii) frequency estimation and compensation, and (iv) phase estimation and compensation. An enabling description of possible frame structures and suitable pilot symbols/sequences can be found, e.g., in commonly owned U.S. patent application Ser. No. 12/964,929 (filed on Dec. 10, 2010), which is incorporated herein by reference in its entirety.

System 100 has an optical add-drop multiplexer (OADM) configured to add signal 130, as known in the art, to other optical signals that are being transported via optical transmission link 140. Link 140 may carry multiple channels. For example, the link may carry optical signals for a mixed transmission system, such as a system for transport of fifteen 10 Gb/s on-off-keying (OOK) channels and one 130 Gb/s PDM-QPSK channel.

Link 140 is illustratively shown as being an amplified link having a plurality of optical amplifiers 144 configured to amplify the optical signals that are being transported through the link, e.g., to counteract signal attenuation. Note that an optical link that does not have optical amplifiers can alternatively be used as well. After propagating the intended length of link 140, signal 130 is dropped from the link via another optical add-drop multiplexer, OADM 146, and directed to receiver 190 for processing. Note that the optical signal applied to receiver 190 by OADM 146 is labeled 130', which signifies the fact that, while in transit between transmitter 110 and receiver 190, signal 130 may accumulate noise and other signal distortions due to various linear effects and nonlinear effects in the optical fiber. One type of a fiber nonlinear effect is intra-channel four-wave mixing (IFWM), which is a function of the phases and amplitudes of the corresponding optical symbols. Another type of a fiber nonlinear effect is inter-channel cross-phase modulation (XPM) caused by neighboring wavelength-division multiplexed (WDM) channels.

Receiver 190 has a front-end circuit 172 comprising an optical-to-electrical (O/E) converter 160, four analog-to-digital converters (ADCs) $166_1$-$166_4$, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by optical local oscillator 156. Reference signal 158 has substantially the same optical-carrier frequency (wavelength) as signal 130'. Reference signal 158 can be generated, e.g., using a tunable laser controlled by a wavelength-control loop (not explicitly shown in FIG. 1) that forces an output wavelength of the tunable laser to closely track the carrier wavelength of signal 130'.

O/E converter 160 operates to mix input signal 130' and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog in-phase signal and an analog quadrature-phase signal, respectively, corresponding to the X-polarization component of signal 130'. Electrical signals $162_3$ and $162_4$ may similarly be an analog in-phase signal and an analog quadrature-phase signal, respectively, corresponding to the Y-polarization component of signal 130'.

In one embodiment, O/E converter 160 is a polarization-diverse 90-degree optical hybrid (PDOH) with four balanced photo-detectors coupled to its eight output ports. Additional information on various O/E converters that can be used to implement O/E converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals $162_1$-$162_4$ generated by O/E converter 160 is converted into digital form in a corresponding one of ADCs $166_1$-$166_4$. Optionally, each of electrical signals $162_1$-$162_4$ may be amplified in a corresponding amplifier (not explicitly shown) prior to the resulting signal being converted into digital form. Digital signals $168_1$-$168_4$ produced by ADCs $166_1$-$166_4$ are processed by a digital signal processor (DSP) 170, e.g., as further described below in reference to FIG. 3, to recover the data of the original input stream 102 applied to transmitter 110.

Figure 3:
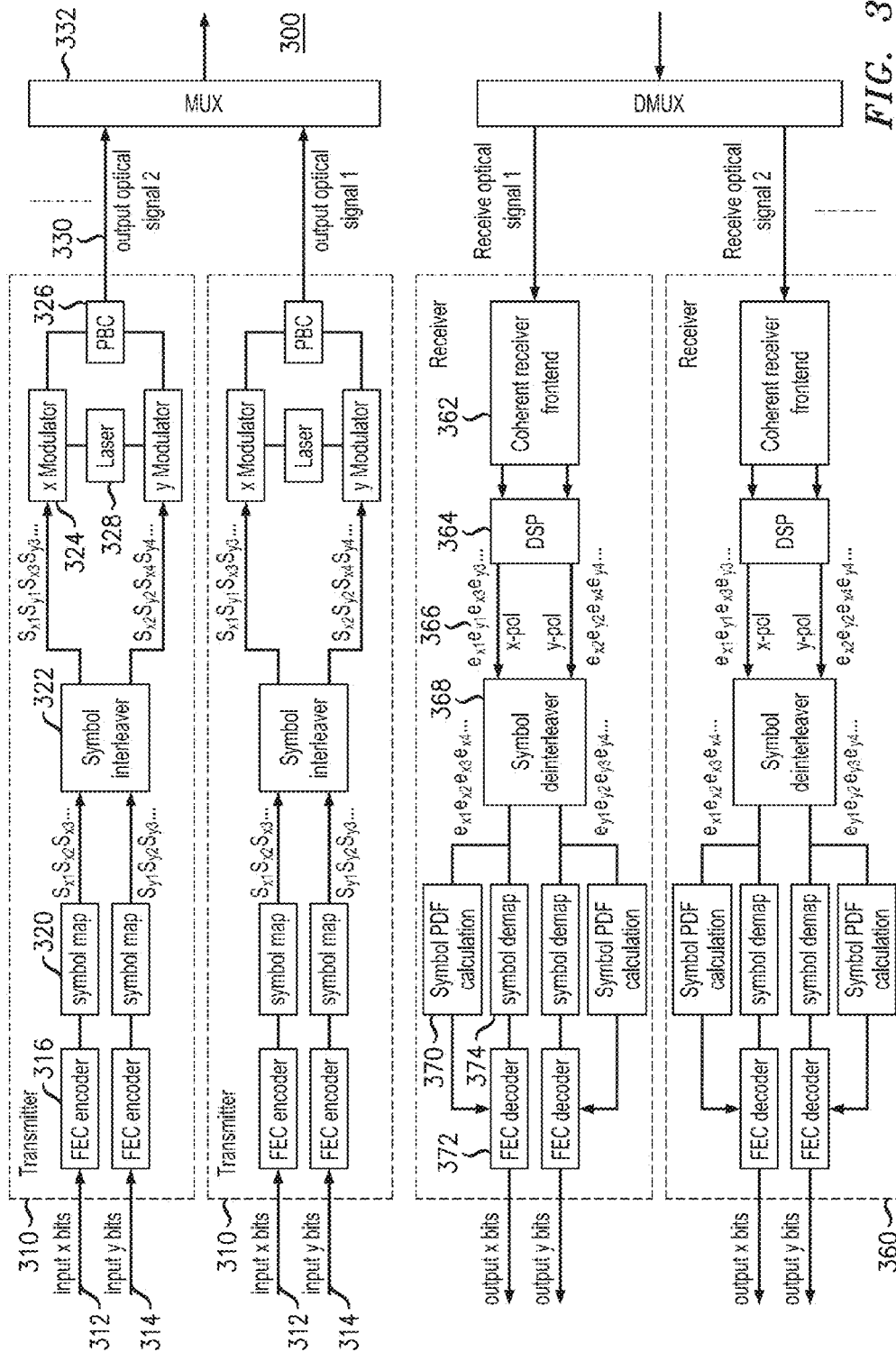
FIG. 3 shows a block diagram of an optical transmission system according to one embodiment of the invention.

FIG. 3 shows a block diagram of an optical transmission system 300 according to one embodiment of the invention. FIG. 3 shows the block diagram of a coherent optical transmitters 310 and receivers 360 contained in one embodiment of the invention. Embodiments of a transmitter 310 according to the principles of the disclosure serve to ultimately interleave the symbols associated with respective input streams of the transmitter onto the x and y polarizations of a transmitted PDM signal. By this transmission methodology upon de-interleaving of the polarization symbols, the BER associated with the respective symbols streams can be brought below the FEC threshold and thus, the receiver will be able to decode the received optical signal and recover the transmitted information for both polarizations.

Embodiments of a receiver according to the principles of the disclosure receive the x and y polarizations of a PDM signal with interleaved symbols that are associated with respective data streams, deinterleave the symbols into generated symbol streams associated with the received polarizations, and decode the respective data streams of the generated symbol streams to recover transmitted data streams. For decoding purposes, embodiments of receiver according to the principles of the invention may utilize a histogram to assist in the log likelihood ratio (LLR) calculation performed by a probability density function (PDF) calculator, the output of which may be used by the FEC decoder to decode the signal.

According to one embodiment and as illustrated in FIG. 3, at the transmitter 310, the incoming information bits (e.g., input x bits 312, input y bits 314) are encoded by a FEC encoder 316 (e.g., a soft decision or hard decision FEC encoder). The FEC encoder uses redundant data in order to reduce the BER at the receiver. Separate FEC encoders may be provided for bits at the x and y bit streams. The input x bits and input y bits are independent, not inter-related, not derived from a single bit stream or a combination thereof. That is, one individual input bit stream may not be subject to the jurisdiction or control of another input bit stream. That is; one individual input bit stream may not be contingent on another input bit stream for its existence. After FEC encoding, the bit streams are mapped by symbol mapper 320 to a symbol constellation. Accordingly, the first symbol stream (Sx1, Sx2, Sx3 ...) and the second symbol stream (Sy1, Sy2, Sy3 ...) generated respectively from the input x bits and input y bits are independent, not inter-related, not derived from a single bit stream or a combination thereof. If these symbols streams were modulated directly to a first PDM optical signal and transported along with multiple other channels, in certain instances the first PDM optical signal may be detrimentally affected by nonlinearities such as cross phase modulation. In certain instance, due to polarization dependent nonlinearities and PDL, there may be a large difference in the BER in x and y polarizations upon recover of a transported signal. The BER of one polarization may fall above a FEC threshold. Therefore, according to one proposed methodology of this invention, the symbols carried by the x and y polarizations of a PDM signal are interleaved so that upon de-interleaving, the BER can be brought below the FEC threshold and thus the receiver will be able to decode received optical signal.

Thus, after encoding of the symbols streams, a symbol interleaver 322 interleaves the symbols (not bits in this instance) to x and y polarizations. The symbols in x and y polarizations are converted to optical signals by optical modulators 324 and then combined by a polarization beam combiner (PBC) 326. Laser 328 also provides input to the optical modulators. Multiple transmitters 310 may generate PDM optical signals 330 in this manner, which may then be provided to a multiplexer 333 for insertion onto a transport medium, such as an optical fiber (not shown).

In another embodiment, the incoming information bits (input x bits, input y bits) associated with a symbol may be interleaved prior to being encoded by the FEC encoder, such as by a soft decision FEC encoder. After FEC encoding, the bit streams are mapped by symbol mapper to a symbol constellation such that interleaved symbols may be presented for modulation and thereafter combined to generate a PDM optical signal.

At the receiver side 360, after the polarization and phase diversity coherent receiver front end 362 and digital signal processing 364, the electrical field signals 366 of the symbols after carrier phase estimation in x and y polarizations are combined by a symbol deinterleaver 368 to undo the interleaving described above. Note that the electrical field signals of the received polarization are interleaved (e.g., x-polarization: ex1, ey1, ex3, ey3 ...; y-polarization ex2, ey2, ex4, ey4 ...) having been transmitted by a receiver according to the principles of the disclosure as described above. The electrical field signals for the polarizations may be simultaneously sent to symbol probability density function (PDF) calculator 370 and FEC decoder 372. Separate FEC decoders may be provided for decoding of bits for x and y polarizations after symbol demapping 374. The output of symbol PDF calculator 370 may be sent to the soft-decision FEC decoder 372 to assist in the decoding of the signal.

One method to calculate the symbol PDF is to divide the complex plane into a grid; then symbol histograms can be built up according to the received symbols. From this histogram, the Symbol PDF calculator can obtain a precise value of the LLR for each received symbol.

Embodiments of the invention may provide improved soft-decision FEC performance in high-speed transport optical networks, which is an important means to increase the reach and capacity of the optical networks. For example, in mixed transport system with co-propagating channels of differing bit rate, utilization of embodiments of the invention may result in improved the post-FEC BER as compared to utilization of conventional transmitters and receivers.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flowcharts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising a coherent optical transmitter, the coherent optical transmitter comprising:
   a first modulator for generating a signal having a first polarization;
   a second modulator for generating a signal having a second polarization; and
   a symbol interleaver configured to:
      receive a first symbol stream and a second symbol stream,
      direct one portion of symbols of the first symbol stream to the first modulator and another portion of the symbols of the first symbol stream to the second modulator modulator, and
      direct one portion of symbols of the second symbol stream to the first modulator and another portion of the symbols of the second symbol stream to the second modulator.

2. The apparatus of claim 1 wherein the interleaver is configured to:
   direct the symbols of the first symbol stream in an alternating manner to the first modulator for modulation onto the signal having the first polarization and to the second modulator for modulation onto the signal having the second polarization;
   direct the symbols of the second symbol stream in a corresponding alternating manner to the first modulator for modulation onto the signal having the first polarization and to the second modulator for modulation onto the signal having the second polarization.

3. The apparatus of claim 1 wherein the interleaver is configured to:
   direct every first of a respective pair of symbols of the first symbol stream to the first modulator and every second of the respective pair of symbols of the first symbol stream to the second modulator; and
   direct every first of a respective pair of symbols of the second symbol stream to the first modulator and every second of the respective pair of symbols of the second symbol stream to the second modulator.

4. The apparatus of claim 1 wherein the coherent optical transmitter further comprises:
   a first forward error correction encoder configured to apply redundancy to a first bit stream to generate a first encoded bit stream; and
   a first symbol mapper configured to generate the first symbol stream from the first encoded bit stream.

5. The apparatus of claim 1 wherein the coherent optical transmitter further comprises:
   a polarization beam combiner configured to generate a polarization division multiplexed optical signal by combining the signal having the first polarization and the signal having the second polarization.

6. The apparatus of claim 5 further comprising an optical receiver, the optical receiver comprising:

a front-end circuit configured to convert the optical signal into a first and second digital electrical signals corresponding to the first and second polarizations; and a processor configured to:
deinterleave symbols of the first and second polarizations to generate deinterleaved polarization data; and
process the deinterleaved polarization data to decode a payload data.

7. The apparatus of claim 6 wherein the processor of the optical receiver is configured to
symbol demap the deinterleaved polarization data; and
forward error correction decode the deinterleaved polarization data that has been demapped.

8. The apparatus of claim 6 wherein the processor of the optical receiver is configured to
perform a symbol probability density function (PDF) calculation on the deinterleaved polarization data; and
provide an output of the PDF calculation to assist in forward error correction decoding.

9. The apparatus of claim 1 wherein the first symbol stream and the second symbol stream are independent.

10. An apparatus comprising a coherent optical transmitter, the coherent optical transmitter comprising:
a first modulator configured to generate a signal having a first polarization;
a second modulator configured to generate a signal having a second polarization; and
a symbol interleaver configured to
receive data associated with a first symbol stream and data associated with a second symbol stream,
direct a first portion of the data associated with the first symbol stream to the first modulator and a second portion of the data associated with the first symbol stream to the second modulator, and
direct a first portion of the data associated with the second symbol stream to the first modulator and a second portion of the data associated with the second symbol stream to the second modulator.

11. The apparatus of claim 10 wherein the interleaver is configured to:
direct portions of the data associated with the first symbol stream in an alternating manner to the first modulator for modulation onto the signal having the first polarization and to the second modulator for modulation onto the signal having the second polarization;
direct portions of the data associated with the second symbol stream in a corresponding alternating manner to the first modulator for modulation onto the signal having the first polarization and to the second modulator for modulation onto the signal having the second polarization.

12. The apparatus of claim 10 wherein the portions of the data associated with the first symbol stream and the portions of the data associated with the second symbol stream are each a number of input bits that define a symbol.

13. The apparatus of claim 10 wherein the portions of the data associated with the first symbol stream and the portions of the data associated with the second symbol stream are each symbols.

14. The apparatus of claim 10 wherein the interleaver is configured to
direct every first portion of the data associated with the first symbol stream to the first modulator and every second portion of the data associated with the first symbol stream to the second; and
direct every first portion of the data associated with the second symbol stream to the first modulator and every second portion of the data associated with the second symbol stream to the second.

15. The apparatus of claim 10 wherein the coherent optical transmitter further comprises:
a forward error correction encoder configured to apply redundancy to the data associated with the first symbol stream, and to the data associated with the second symbol stream, that are directed to the first modulator; and
a symbol mapper configured to generate an interleaved symbol stream from the data associated with the first symbol stream, and the data associated with the second symbol stream, that is directed to the first modulator after redundancy application, wherein the first modulator is configured to modulate an optical signal with the interleaved symbol stream to generate the signal having the first polarization.

16. The apparatus of claim 10 wherein the coherent optical transmitter further comprises:
a forward error correction encoder configured to apply redundancy to the first portion of the data associated with the first symbol stream, and the first portion of the data associated with the second symbol stream, that are directed to the first modulator; and
a symbol mapper configured to generate an interleaved symbol stream from the first portion of the data associated with the first symbol stream, and the first portion of the data associated with the second symbol stream that is directed to the first modulator after the application of redundancy, wherein the first modulator is configured to modulate an optical signal with the interleaved symbol stream to generate the first polarization.

17. The apparatus of claim 10 wherein the first symbol stream and the second symbol stream are independent.

18. The apparatus of claim 10 further comprising
a coherent optical receiver configured to decode a received optical signal with interleaved polarizations, the coherent optical receiver configured to deinterleave polarizations of the received optical signal prior to symbol demapping.

19. The apparatus of claim 10 further comprising a
coherent optical receiver configured to decode a received optical signal with interleaved polarizations, the coherent optical receiver configured to deinterleave the interleaved polarizations in a manner corresponding to the coherent optical transmitter.

20. A method comprising:
receiving, at a transmitter, first and second bit streams,
mapping the first bit stream to a first symbol stream, and mapping the second bit stream to a second symbol stream;
directing a first subset of symbols of the first symbol stream toward a first modulator configured to produce a first optical signal having a first polarization, and directing a second subset of symbols of the first symbol stream toward a second modulator configured to produce a second optical signal having a second polarization, and
directing a first subset of symbols of the second symbol stream toward the first modulator and a second subset of symbols of the second symbol stream toward the second modulator.

21. The method of claim 20 further comprising
modulating the first optical signal based on the first subsets; and
modulating the second optical signal based on the second subsets.

22. The method of claim 20 wherein the directing of the first and second subsets of the first symbol stream is performed in an alternating manner, and wherein the directing of the first and second subsets of the second symbol stream is performed in a manner corresponding to the alternating manner.

23. The method of claim 20 wherein directing of the first and second subsets of the first symbol stream directs every first of a respective pair of symbols of the first symbol stream to the first modulator for modulation of the optical signal and directs every second of the respective pair of symbols of the first symbol stream to the second modulator for modulation of the second optical signal; and wherein the directing of the first and second subsets of the second symbol stream directs every first of a respective pair of symbols of the second symbol stream to the first modulator for modulation of the first optical signal and every second of the respective pair of symbols of the second symbol stream to the second modulator for modulation of the second optical signal.

24. The method of claim 20 further comprising:
applying redundancy to the first and second bit streams before said mapping.

25. The method of claim 20 wherein the first and second bit streams are independent.

* * * * *